US012562537B1

(12) United States Patent
Yu et al.

(10) Patent No.: US 12,562,537 B1
(45) Date of Patent: Feb. 24, 2026

(54) RETRACTABLE DATA CABLE MODULE AND SYSTEM

(71) Applicant: Anyun Yu, Guangdong (CN)

(72) Inventors: Anyun Yu, Guangdong (CN); Hongyun Yu, Guangdong (CN)

(*) Notice: Subject to any disclaimer, the term of this patent is extended or adjusted under 35 U.S.C. 154(b) by 0 days.

(21) Appl. No.: 19/221,616

(22) Filed: May 29, 2025

(30) Foreign Application Priority Data

Feb. 11, 2025 (CN) ......................... 202510150821.1

(51) Int. Cl.
*H01R 13/72* (2006.01)

(52) U.S. Cl.
CPC .................................... *H01R 13/72* (2013.01)

(58) Field of Classification Search
CPC ...................................................... H01R 13/72
See application file for complete search history.

(56) References Cited

U.S. PATENT DOCUMENTS 7,389,955 B2 * 6/2008 Liao .................. B65H 75/4431 242/378.1
10,556,773 B2 * 2/2020 Tang ...................... B65H 75/48
2012/0320546 A1 * 12/2012 Wu ...................... H01R 31/065 361/755
2024/0243531 A1 * 7/2024 Chu ....................... H01R 13/72

* cited by examiner

*Primary Examiner* — Briggitte R. Hammond
(74) *Attorney, Agent, or Firm* — Cooper Legal Group, LLC

(57) ABSTRACT

The present application relates to a retractable data cable module and system. The retractable data cable module includes a shell including an upper housing and a lower housing engaged to each other; a rotating shaft fixedly disposed at a center of the upper housing; a spring sleeved on the rotating shaft and rotatably connected to the rotating shaft; the spring disposed at a center of a rotating seat and having two ends respectively fixed to the rotating shaft and the rotating seat; and a data cable wound around an exterior of the rotating seat and having a first end fixed to the rotating seat.

3 Claims, 3 Drawing Sheets

RETRACTABLE DATA CABLE MODULE AND SYSTEM

CROSS-REFERENCE TO RELATED APPLICATION

This application claims the priority to Chinese patent application serial no. 202510150821.1, filed on Feb. 11, 2025. The entirety of Chinese patent application serial no. 202510150821.1 is hereby incorporated by reference herein and made a part of this specification.

TECHNICAL FIELD

The present application relates to a technical field of data transmission and charging devices, and in particular, to a retractable data cable module and system.

BACKGROUND

With a popularity of mobile devices, data cables, as essential accessories for connecting devices to power supplies, are increasingly attracting attentions of users for their convenience and practicality. Retractable data cables, which are easy to carry and store, have gained widespread popularity in a market. This design not only enhances user experience but also reduces tangling caused by excessive long data cables, thereby improving efficiency in work and daily life. However, existing retractable data cables still have shortcomings in terms of structural complexity, reliability, flexibility, and functional expandability.

At present, the retractable data cables in the market mostly utilize complex mechanical structures to achieve a retractable function. Common design configurations incorporate interconnected upper and lower housings that enclose a plurality of components such as a control chip, a coil spring base, and a locking component. These components operate together to ensure that the data cables can extend when needed and automatically retract when not needed. Specifically, some designs utilize a spring-driven reel mechanism to achieve automatic retraction of data cables through an elastic restoring force of the spring, while other designs incorporate micro switches or sensors to detect status of data cables and trigger corresponding actions. In addition, some designs utilize a gear transmission system to precisely control movement of data cables through meshing relationships of gears.

Although various solutions mentioned above have addressed issues of data cables retraction to some extent, their common problem is that the structure is too complex, which not only increases manufacturing costs and maintenance difficulties, but may also lead to higher failure rates and affect user experience. Especially for frequently used occasions such as public places or offices, such complex designs are prone to problems such as lagging and breakage, which reduces reliability and durability of the products. Therefore, developing a structurally simple, reliable, and flexible retractable data cable module is particularly important.

SUMMARY

The present application provides a retractable data cable module and system to overcome the above technical problems.

A retractable data cable module, includes a shell, including an upper housing and a lower housing engaged to each other; a rotating shaft fixedly disposed at a center of the upper housing, a spring sleeved on the rotating shaft and rotatably connected to the rotating shaft; the spring disposed at a center of a rotating seat and having two ends respectively fixed to the rotating shaft and the rotating seat; and a data cable wound around an exterior of the rotating seat and having a first end fixed to the rotating seat, when the data cable is pulled, the rotating seat is driven to rotate, thereby compressing the spring, and when the data cable is released, the spring is reset through elastic deformation, causing the rotating seat to rotate reversely, thereby achieving automatic retraction of the data cable.

According to the above technical solution, the retractable data cable module not only simplifies a mechanical structure, reduces production costs and maintenance difficulties, but also improves reliability and durability of the system. The automatic retraction of the data cable can be achieved by using an elastic recovery force of the spring, and thus inconvenience caused by manual intervention may be avoided and user experience may be improved. In addition, this design can effectively reduce wear caused by frequent manual operations, thereby extending service life of the product.

Optionally, the lower housing is fixedly provided with a first circuit board, the first circuit board is provided with a first gold finger; the lower housing is provided with a second circuit board, the second circuit board is provided with a second gold finger; in an assembled state, the first gold finger and the second gold finger are in contact with each other and electrically connected; and the first end of the data cable passes through the rotating seat and is electrically connected to the second circuit board.

According to the above technical solution, electrical connection stability of the data cable module is improved. Specifically, the gold finger design on the first circuit board and the second circuit board ensures a reliable electrical connection between the data cable and the circuit board, avoiding data transmission interruptions caused by poor contact. Meanwhile, the gold finger design also simplifies an internal structure, reducing manufacturing costs and maintenance difficulties. In addition, by using the thickened gold fingers, current carrying capacity is further enhanced, the service life is extended, and overall performance is improved.

Optionally, each of the first gold finger and the second gold finger is a thickened metal finger.

According to the above technical solution, reliability and stability of electrical connection are significantly improved by using the first gold finger and the second gold finger. The thickened design increases a contact area, reduces resistance, reduces heating problems caused by excessive current, and extends the service life. In addition, the thickened metal fingers have enhanced physical strength, preventing breakage or deformation during frequent insertion and removal, and further improving durability of the product.

Optionally, the upper housing is provided with a locking device including a locking protrusion and an elastic tab, the locking protrusion is rotatably connected to the upper housing; a plurality of locking grooves are arranged circumferentially on a side wall of the rotating seat and configured to engage and cooperate with the locking protrusion.

According to the above technical solution, when the data cable is pulled to a preset length, the locking device can achieve different functions in different situations. If the data cable is released suddenly, the locking protrusion will quickly enter one of the locking grooves under an external elastic force, which effectively prevents the rotating seat from continuing to rotate, thereby ensuring that the data cable remains in its current position and avoiding excessive extension or contraction of the data cable due to inertia. When the data cable is released while continuing to be applied with a slight pulling force by the users, the locking protrusion will remain outside the locking grooves, without affecting the elastic recovery force of the spring, allowing the data cable to retract smoothly and automatically. In addition, the design of the elastic tab not only helps to reset the locking protrusion, but also produces a pleasant sound during operation, improving the user experience.

Optionally, when the data cable is suddenly released after being pulled to a preset length, the locking protrusion enters one of the plurality of locking grooves under an external elastic force, thereby preventing the rotating seat from continuing to rotate, and retaining the data cable in a current position.

According to the above technical solution, when the data cable is suddenly released after being pulled to the preset length, the locking protrusion quickly enters the locking groove under the external elastic force, preventing the rotating seat from continuing to rotate, thereby keeping the data cable in its current position. This design effectively avoids the data cable from immediately retracting due to the elastic recovery force of the spring, ensuring that users can easily adjust and fix a length of the data cable during use, improving stability and convenience in the usage. At the same time, this function requires no additional operations, improving the user experience.

Optionally, when the data cable is pulled to the preset length and then released while continuing to be applied with a slight pulling force, the locking protrusion is positioned outside the plurality of locking grooves, and the data cable is automatically retracted by the rotating seat relying on an elastic recovery force of the spring.

According to the above technical solution, when the data cable is pulled to the preset length and then released while continuing to be applied with the slight pulling force, the locking protrusion is positioned outside the locking grooves, and the data cable is automatically retracted by the rotating seat relying on the elastic recovery force of the spring. This design not only ensures that the data cable can be quickly retracted when needed, improving the convenience in the usage, but also prevents the data cable from jamming due to sudden release, improving the user experience. At the same time, this solution simplifies the operation process, reduces the complexity of the mechanical structure, lowers failure rates and maintenance costs.

Optionally, the elastic tab is fixed on an inner wall of the upper housing, when the locking protrusion squeezes the elastic tab after rotating a certain angle, elastic deformation of the elastic tab is generated, which allows the locking protrusion to smoothly reset while generating a pleasant sound.

According to the above technical solution, when the locking protrusion rotates a certain angle, the elastic stab is squeezed to generate elastic deformation, which not only ensures a smooth reset of the locking protrusion, but also enhances a feel and sound feedback of the operation, improving the user experience.

A retractable data cable system including the retractable data cable module mentioned above further includes a charging mechanism, the retractable data cable module is provided inside the charging mechanism, a second end of the data cable is electrically connected to the charging mechanism, and the charging mechanism is connected to an external electronic device through the data cable.

According to the above technical solution, the charging mechanism can be electrically connected to the external electronic device through the data cable, ensuring the stability of data transmission and charging. At the same time, this design simplifies an overall structure of the system, improves the reliability and service life, and facilitates user operation in various usage scenarios.

In summary, the present application includes at least one of the following beneficial technical effects:

1. By adopting a simple spring and rotating seat structure, the internal mechanical structure of the retractable data cable is significantly simplified, manufacturing costs and maintenance difficulties are reduced, and reliability and durability of the product are improved.
2. The design of the locking device effectively prevents accidental retraction of the data cable when suddenly released, thereby ensuring operational reliability in different usage scenarios and enhancing the user experience.
3. The thickened design of the first gold finger and the second gold finger ensures good electrical connection performance, thereby improving efficiency and stability of the transmission.

DETAILED DESCRIPTION

The present application is further described in detail below with reference to FIGS. 1-3.

Embodiment 1

Figure 1:
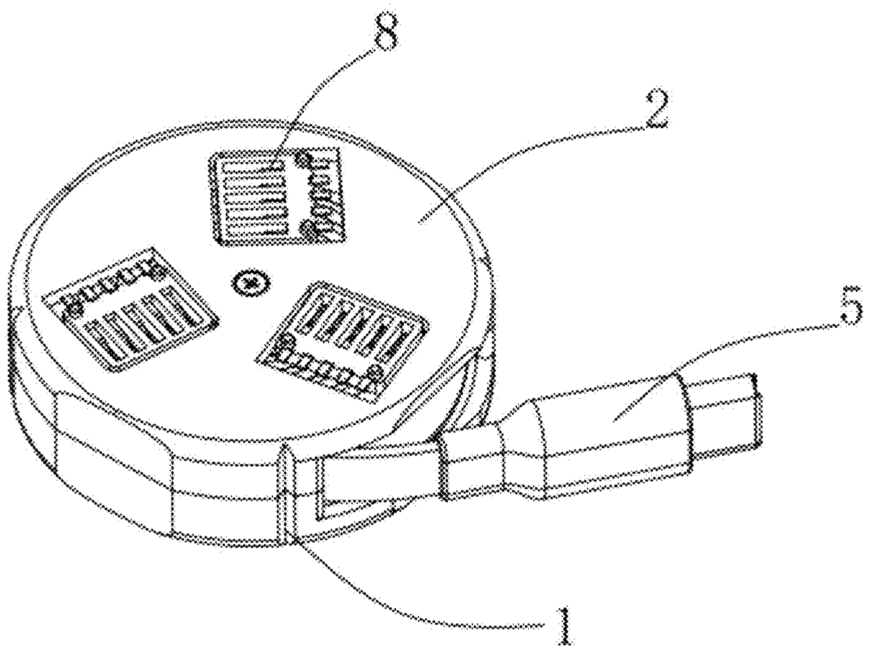
FIG. 1 is a general schematic structure view of a retractable data cable module according to an embodiment of the present application.
Figure 2:
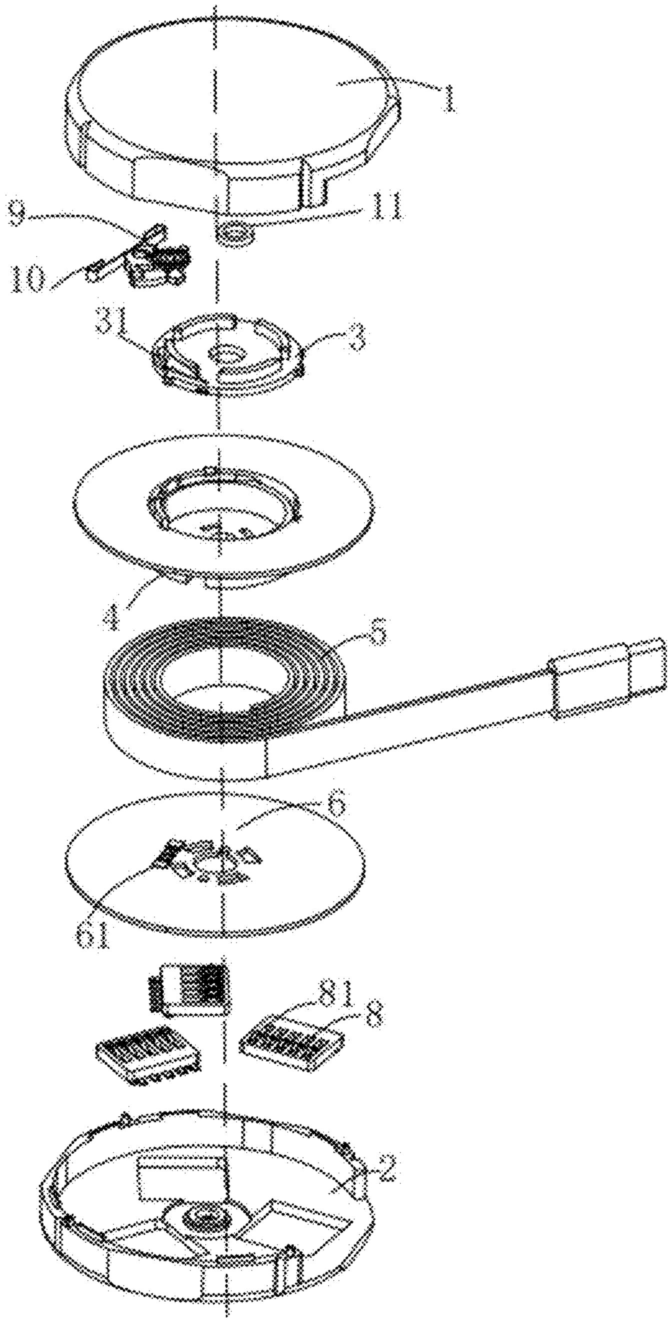
FIG. 2 is an exploded schematic view of the retractable data cable module according to the embodiment of the present application.

Referring to FIGS. 1 and 2, an embodiment of the present application provides a retractable data cable module, including a shell, which includes an upper housing 1 and a lower housing 2 engaged to each other; a rotating shaft 11 fixedly disposed at a center of the upper housing 1; a spring 3 sleeved on the rotating shaft 11 and rotatably connected to the rotating shaft 11: the spring 3 disposed at a center of a rotating seat 4; and a data cable 5 wound around an exterior of the rotating seat 4, two ends of the spring 3 are respectively fixed to the rotating shaft 11 and the rotating seat 4, a first end of the data cable 5 is fixed to the rotating seat 4. When the data cable 5 is pulled, the rotating seat 4 is driven to rotate, the spring 3 is compressed, and when the data cable 5 is released, the spring 3 is reset through elastic deformation, which causes the rotating seat 4 to rotate reversely, thereby achieving automatic retraction of the data cable 5. In this way, the retractable data cable module in the present application has a simplified structure and improved reliability and flexibility.

Specifically, the upper housing 1 and the lower housing 2 included in the shell may be fixed by threaded connection or snap connection. The center of the upper housing 1 is fixed with the rotating shaft 11 through welding or bonding, and the rotating shaft 11 may be made of high-strength materials such as stainless steel or aluminum alloy to ensure its durability. The spring 3 is sleeved on the rotating shaft 11, and the spring 3 and the rotating shaft 11 may be connected through a bearing to reduce friction and extend service life.

The spring 3 is disposed at the center of the rotating seat 4 and has two ends respectively fixed to the rotating shaft 11 and the rotating seat 4. The spring 3 may be made of spring steel or other high-elastic materials to ensure that it can be used repeatedly without failure. One end of the data cable 5 is fixed to the rotating seat 4, firm connection therebetween may be achieved by crimping or welding. The data cable 5 may be configured as a flexible cable, such as copper-core polyvinyl chloride insulated wire, to enhance flexibility and bending resistance.

When the data cable 5 is pulled by a user, the rotating seat 4 will rotate along with the data cable 5, and the spring 3 will be compressed to store energy. Once the data cable 5 is released by the user, the spring 3 will release the stored energy, driving the rotating seat 4 to rotate reversely, thereby retracting the data cable 5. This design not only greatly simplifies a complex mechanical structure of a traditional retractable data cable but also enhances the reliability and durability of the data cable 5.

Furthermore, in order to enhance stability of electrical connections, a first circuit board 6 may be fixedly provided on the lower housing 2, and the first circuit board 6 is provided with a first gold finger 61. Similarly, a second circuit board 8 is provided on the lower housing 2, and the second circuit board 8 is provided with a second gold finger 81. The first gold finger 61 and the second gold finger 81 are in contact with each other and electrically connected, and one end of the data cable 5 passes through the rotating seat 4 and is electrically connected to the second circuit board 8. The first gold finger 61 and the second gold finger 81 may be configured as thickened metal fingers to improve current transmission capability and prevent poor contact. For example, the first gold finger 61 and the second gold finger 81 may be made of copper alloys plated with silver or nickel to enhance conductivity and oxidation resistance thereof.

In addition, in order to avoid accidental retraction of data cable 5 during usage, a locking device may also be provided on the upper housing 1. The locking device includes a locking protrusion 9 and an elastic tab 10. The locking protrusion 9 is rotatably connected to the upper housing 1, and a plurality of locking grooves 31 are arranged circumferentially on a side wall of the rotating seat 4. Each of the locking grooves 31 is configured to engage and cooperate with the locking protrusion 9. When the data cable 5 is suddenly released after being pulled to a preset length, the locking protrusion 9 will enter one of the locking grooves 31 under an external elastic force, preventing the rotating seat 4 from continuing to rotate, thereby retaining the data cable 5 in its current position. Specifically, when the data cable 5 is suddenly released by the locking protrusion 9, the locking protrusion 9 will quickly rotate and fall into a nearest locking groove 31 due to inertia and external elastic force (such as elastic elements inside the upper housing 1), thereby locking a position of the rotating seat 4 and retaining the data cable 5 at a required length. This design is particularly suitable for situations where a length of data cable 5 needs to be temporarily fixed, such as avoiding inconvenience caused by a random swinging of the data cable 5 during charging in public places.

In another case, when the data cable 5 is pulled to a preset length and then released while continuing to be applied with a slight pulling force, the locking protrusion 9 will be positioned outside of the locking grooves 31, and the data cable 5 is automatically retracted by the rotating seat 4 relying on an elastic recovery force of the spring 3. Specifically, when the user continue to apply the slight pulling force while releasing the data cable 5, the locking protrusion 9 is subjected to continuous outward force and cannot enter the locking grooves 31, but remains in an outer position. At this time, the elastic recovery force of the spring 3 will push the rotating seat 4 to rotate reversely, thereby driving the data cable 5 to retract automatically. This design achieves free extension and smooth retraction of the data cable 5 without adding additional operations, and thus user experience may be improved.

Finally, in order to increase operational feedback for users, an inner wall of the upper housing 1 may be fixed with an elastic tab 10. When the locking protrusion 9 rotates a certain angle, it will squeeze the elastic tab 10, and thus elastic deformation of the elastic tab 10 may be generated, which allows the locking protrusion 9 to smoothly reset and while generating a pleasant sound. This sound can not only remind the users that the data cable 5 is locked in place, but also provides premium tactile feedback, elevating product interactivity and perceived sophistication.

An implementation principle of this embodiment is to achieve an automatic retractable function of the data cable 5 through a simplified mechanical structure and reasonable electrical design. Compared to the complex mechanical structure in an existing technology, the present application not only reduces manufacturing costs and maintenance difficulties, but also improves operational reliability and structural durability. Especially in high-utilization environments such as public places or offices, this simplified design can effectively avoid problems such as lagging and breakage, improving the user experience.

Embodiment 2

Embodiment 2 differs from the above embodiment by incorporating an enhanced protection circuit to elevate safety of the system. Specifically, in addition to a charging plug and a charging interface, a charging mechanism further integrates a protection circuit on the first circuit board 6 or the second circuit board 8. The protection circuit may include functions such as overcurrent protection, short circuit protection, and temperature protection to prevent safety hazards caused by excessive current or high temperature during operation of data cable 5.

Specifically, the protection circuit may be integrated on the first circuit board 6 or the second circuit board 8, depending on an actual requirement and design layout. The protection circuit may includes key assemblies such as a fuse, a thermistor, and a MOSFET (Metal-Oxide-Semiconductor Field-Effect Transistor). The fuse may be configured to break the circuit when the current exceeds a predetermined value, preventing overloading. The thermistor may be configured to monitor temperature changes and cut off a power supply when the temperature exceeds a safe threshold. The MOSFET may be configured to quickly respond to changes in current and cut off the circuit in a timely manner.

In addition, the protection circuit may be equipped with an LED indicator light. When the circuit operates under normal conditions, the indicator light emits green illumination; when an abnormal condition is detected, the indicator light transitions to red illumination to alert users to check the circuit or replace the device. This design not only enhances the safety of the data cable 5 but also provides real-time operational status visualization, thereby improving the user experience.

An implementation principle of this embodiment is as follows: the safety of the entire system is significantly improved by applying the protection circuit to the charging mechanism. Especially in a case of long-term use or high-frequency charging and discharging, the protection circuit can effectively prevent accidents caused by excessive current or high temperature, ensuring personal and property safety of users. At the same time, a design of the LED indicator light also enables users to intuitively determine whether the device operates properly, further enhancing practicality and reliability of the product.

Embodiment 3

Embodiment 3 differs from the above embodiments by integrating an anti-interference shielding layer into the data cable 5, thereby improving stability and anti-interference ability of the signal transmission. Specifically, in addition to a regular conductive cable, the data cable 5 is also wrapped with a layer of metal woven mesh, which forms the anti-interference shielding layer. The metal woven mesh may be configured to attenuate external electromagnetic radiation interference, ensuring accuracy and stability of the data transmission.

Specifically, an internal structure of the data cable 5 includes three layers: an innermost layer is the conductive cable, a middle layer is an insulation layer, and an outermost layer is the metal woven mesh. The conductive cable usually adopts a plurality of strands of thin copper wire twisted into bundles to increase a conductive cross-sectional area and reduce resistance. The insulation layer may be made of materials such as polyethylene or polypropylene to ensure good insulation performance and flexibility. The metal woven mesh may be made of copper or aluminum wire, which is both lightweight and has good conductivity.

In addition, the metal woven mesh also needs to be grounded to fully utilize its shielding effect. The grounding of the metal woven mesh includes providing a grounding contact at each end of the data cable 5, and connect the grounding contact to a ground wire of an electronic device through a dedicated grounding pin. This design advantageously maximizes absorption and dissipation of external electromagnetic interference, protecting the data transmission channel from conductive noise.

An implementation principle of this embodiment is as follows: the stability and anti-interference ability of data transmission are significantly improved by integrating the anti-interference shielding layer on the data cable 5. Especially in strong electromagnetic environments, such as factory workshops or hospital operating rooms, this design can ensure that the data cable 5 is not affected by external electromagnetic interference, ensuring the accuracy of the data transmission. At the same time, the selection of the metal woven mesh and the grounding design can effectively reduce a radiation of data cable 5 itself, reducing interference with surrounding environments.

Embodiment 4

Embodiment 4 differs from the above embodiments by integrating an intelligent identification chip at an end of the data cable 5, which supports a plurality of communication protocols and improves versatility and compatibility of the data cable 5. Specifically, the intelligent identification chip may be embedded inside a USB interface of the data cable 5, and different communication standards can be converted and adapted through a built-in firmware program.

Specifically, the intelligent identification chip may be implemented by an ARM architecture microcontroller, which has high-speed computing capability and low power consumption characteristics. The intelligent identification chip can automatically adjust operation modes of the data cable 5 according to a type and communication protocol of a connected device, and can support a plurality of standards such as USB 2.0, USB 3.0, Type-C. In addition, the intelligent identification chip can also regularly receive new firmware versions pushed by manufacturers through its built-in firmware update function to adapt to changes in new communication technologies and standards.

In order to ensure efficiency and stability of the data transmission, the intelligent identification chip may also be integrated with some auxiliary functions, such as data caching, error checking, and traffic control. The data caching function may be used for temporarily storing a large number of data packets, reducing a burden on a host. The error checking function may be used for monitoring error information in real-time during the data transmission and correcting errors in a timely manner; the traffic control function may be used for dynamically adjusting a data transmission rate to avoid network congestion.

An implementation principle of this embodiment is as follows: the versatility and compatibility of the data cable 5 are significantly improved by integrating the intelligent identification chip at the end of the data cable 5. No matter what type of device utilized by the users, efficient communication connection can be easily achieved through the data cable 5. This design not only facilitates daily use by users, but also reserves space for future communication technology development, enhancing a long-term competitiveness of the product.

Embodiment 5

Figure 3:
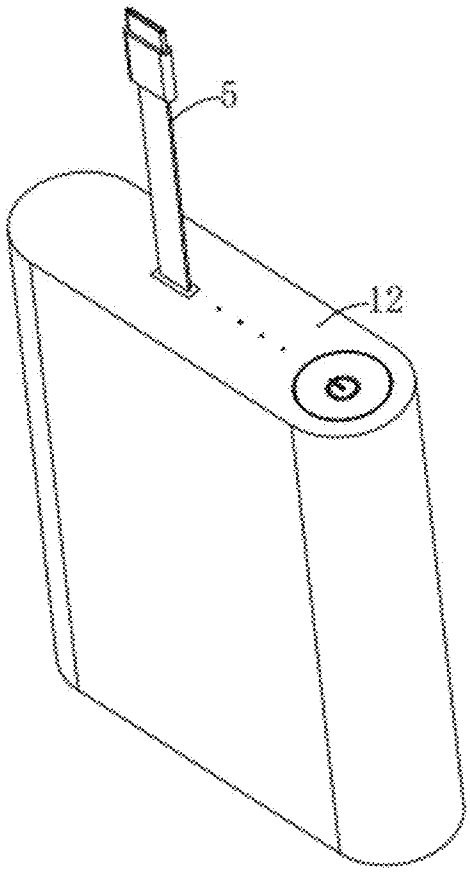
FIG. 3 is a schematic structure view of a retractable data cable system according to the embodiment of the present application.

Referring to FIGS. 2 and 3, Embodiment 5 provides a retractable data cable system including the retractable data cable module and the charging mechanism 12. The charging mechanism 12 includes the charging plug and the charging interface (not shown). Specifically, the charging plug is configured to be inserted into a power socket, the charging interface is configured to connect with the device to be charged, and the retractable data cable module is built into a housing of the charging mechanism 12, an end of the data cable 5 is electrically connected to the charging mechanism 12, and the charging mechanism 12 is electrically connected to the electronic device through the data cable 5 to achieve a charging function.

Specifically, the charging plug may be implemented as a two-hole or three-hole plug that complies with international standards, which is suitable for various power sockets. The charging interface may be implemented as a common interface such as Micro USB and Type-C to meet needs of different types of devices. The charging mechanism 12 further includes the protection circuit, which is integrated on the first circuit board 6 or the second circuit board 8 and has functions such as overcurrent protection, short circuit protection, and temperature protection to prevent safety hazards caused by excessive current or high temperature during the use of the data cable 5.

In addition, the charging mechanism 12 can also be equipped with the LED indicator light, which emits green illumination when the circuit operates under normal conditions; when an abnormal condition is detected, the indicator light transitions to red illumination to alert the users to check the circuit or replace the device. This design not only enhances the safety of the data cable 5, but also facilitates provides real-time operational status visualization, thereby improving the user experience.

An implementation principle of this embodiment is as follows: a complete and powerful data cable system is formed by combining the retractable data cable module with the charging mechanism 12. This design not only inherits simplicity and reliability of the retractable data cable module, but also further improves an overall performance and safety of the system through the protection circuit of the charging mechanism and other additional functions. This data cable system demonstrates universal applicability across domestic and commercial environments, and provides optimized service across diverse usage scenarios.

Embodiment 6

The present application further provides a method for charging and data transmission using the retractable data cable module mentioned above, which includes specific steps as follows:

S1, starting the charging mechanism 12 and observing a status of the indicator light of the charging mechanism 12.

S2, pulling the data cable 5 to the required length, and at this time, the rotating seat 4 rotates along with the data cable 5, and the spring 3 is compressed to store energy.

S3, when the data cable 5 is released suddenly after being pulled to the preset length, the locking protrusion 9 enters one of the locking grooves 31 under the external elastic force, preventing the rotating seat 4 from continuing to rotate, thereby retaining the data cable 5 in its current position. Specifically, when the data cable 5 is released suddenly by the locking protrusion 9, the locking protrusion 9 will quickly rotate and fall into the nearest locking groove 31 due to inertia and external elastic force (such as the elastic element inside the upper housing 1), thereby locking the position of the rotating seat 4 and retaining the data cable 5 at the required length.

S4, If it is necessary to shorten the data cable 5, the slight pulling force may be applied while releasing the data cable 5, the locking protrusion 9 will be pushed to outside of the locking groove 31, the data cable 5 is automatically retracted by the rotating seat 4 relying on the elastic recovery force of the spring 3. Specifically, when the users continue to apply the slight pulling force while releasing the data cable 5, the locking protrusion 9 is subjected to continuous outward force and cannot enter the locking groove 31, but remains in the outer position. At this time, the elastic recovery force of the spring 3 will push the rotating seat 4 to rotate reversely, thereby driving the data cable 5 to retract automatically.

S5, after charging is complete, unplugging the data cable 5 from the charging plug and the charging interface, and organizing the data cable 5 for future use.

An implementation principle of this embodiment is as follows: users are enabled to use the retractable data cable module for charging and data transmission through simple and clear operation steps. Especially the automatic retractable function of the data cable 5 can provide great convenience in various usage scenarios, reduce tedious operations, and improve the user experience.

The above are the preferred embodiments of the present application, which are not intended to limit the protection scope of the present application. Therefore, all equivalent changes made according to the structure, shape and principle of the present application should be covered within the protection scope of the present application.

LISTING OF REFERENCE SIGNS

1 upper housing
2 lower housing
3 spring
31 locking groove
4 rotating seat
5 data cable
6 first circuit board
61 first gold finger
8 second circuit board
81 second gold finger
9 locking protrusion
10 elastic tab
11 rotating shaft
12 charging mechanism

What is claimed is:

1. A retractable data cable module, comprising:

a shell comprising an upper housing and a lower housing engaged to each other;

a rotating shaft fixedly disposed at a center of the upper housing;

a spring sleeved on the rotating shaft and rotatably connected to the rotating shaft, wherein the spring is disposed at a center of a rotating seat and has two ends respectively fixed to the rotating shaft and the rotating seat; and a data cable wound around an exterior of the rotating seat and having a first end fixed to the rotating seat, when the data cable is pulled, the rotating seat is driven to rotate, thereby compressing the spring, and when the data cable is released, the spring is reset through elastic deformation, causing the rotating seat to rotate reversely, thereby achieving automatic retraction of the data cable.

2. The retractable data cable module according to claim 1, wherein the lower housing is fixedly provided with a first circuit board, the first circuit board is provided with a first gold finger; the lower housing is provided with a second circuit board, the second circuit board is provided with a second gold finger; in an assembled state, the first gold finger and the second gold finger are in contact with each other and electrically connected; and the first end of the data cable passes through the rotating seat and is electrically connected to the second circuit board.

3. The retractable data cable module according to claim 2, wherein each of the first gold finger and the second gold finger is configured as a thickened metal finger.

* * * * *